United States Patent [19]

Carey et al.

[11] Patent Number: 4,543,629
[45] Date of Patent: Sep. 24, 1985

[54] APPARATUS FOR MAXIMIZING BUS UTILIZATION

[75] Inventors: Richard A. Carey, Ashland; Jerry Falk, Medway, both of Mass.

[73] Assignee: Honeywell Information Systems Inc., Waltham, Mass.

[21] Appl. No.: 690,836

[22] Filed: Jan. 14, 1985

Related U.S. Application Data

[63] Continuation of Ser. No. 372,909, Apr. 29, 1982, abandoned.

[51] Int. Cl.[4] .............................................. G06F 3/04
[52] U.S. Cl. ..................................... 364/200; 370/85
[58] Field of Search ... 364/200 MS File, 900 MS File; 370/85

[56] References Cited

U.S. PATENT DOCUMENTS

| | | | |
|---|---|---|---|
| 4,038,641 | 7/1977 | Bouknecht et al. | 364/200 |
| 4,038,642 | 7/1977 | Bouknecht et al. | 364/200 |
| 4,128,876 | 12/1978 | Ames et al. | 364/200 |
| 4,204,254 | 5/1980 | Muzzani et al. | 364/200 |

Primary Examiner—Eddie P. Chan
Attorney, Agent, or Firm—Nicholas Prasinos

[57] ABSTRACT

An interactive terminal computer system is disclosed having a system bus for communicating between elements of the computer system which has apparatus for permitting the execution of a maximum number of concurrent bus cycles without interference with each other.

7 Claims, 8 Drawing Figures

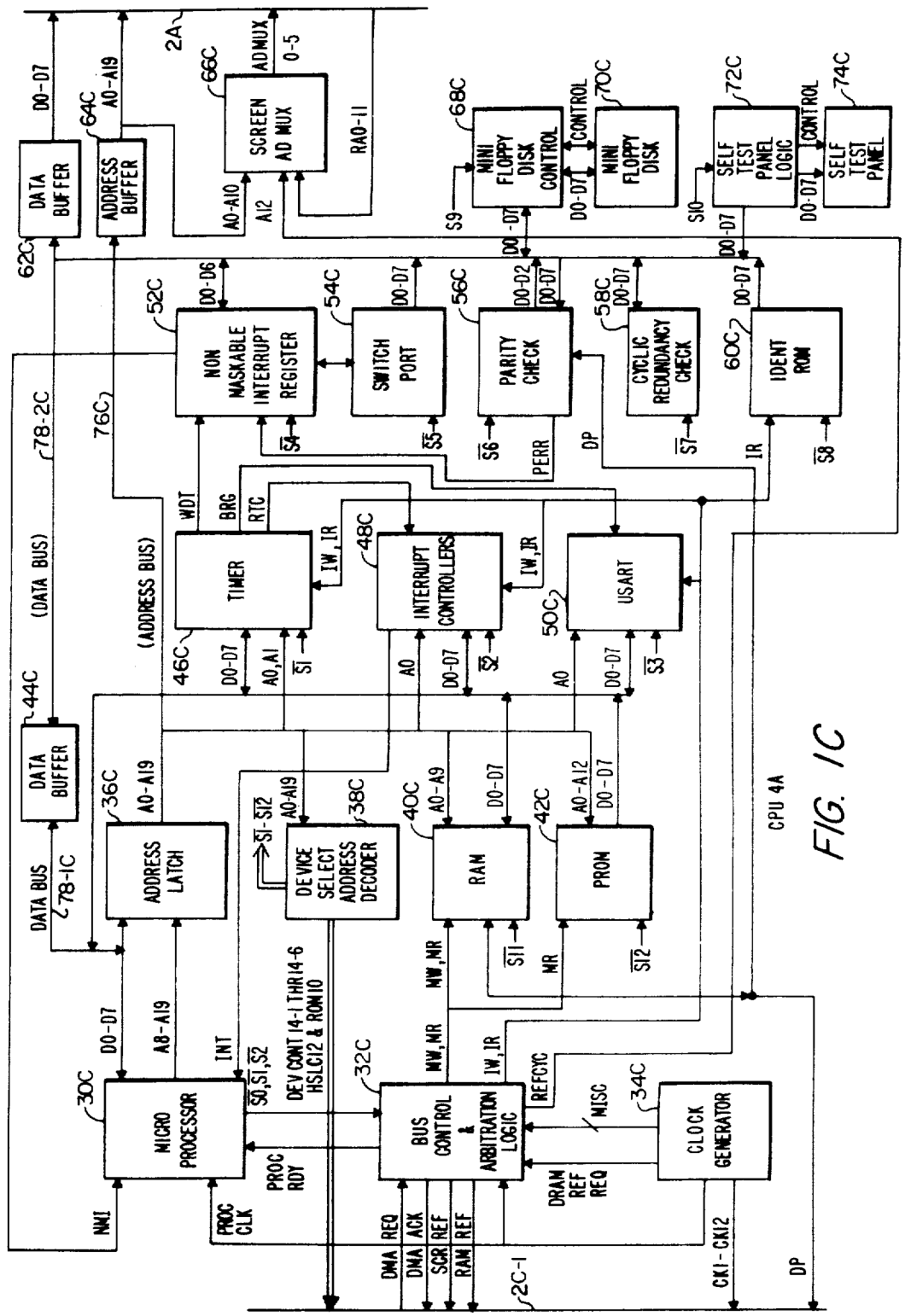

APPARATUS FOR MAXIMIZING BUS UTILIZATION

This application is a continuation of application Ser. No. 372,909, filed Apr. 29, 1982, now abandoned.

BACKGROUND OF THE INVENTION

1. Field of the Invention

The invention relates generally to an interactive terminal computer system having a system bus for communicating between elements of the computer system, and more particularly to an apparatus for permitting the maximum number of substantially concurrent bus cycles without interference with each other.

2. Description of the Prior Art

Most computer systems include one or more terminal systems as an element of the computer system with each terminal system having a number of subsystems each coupled to a central processor unit (CPU) which includes a microprocessor, and to other peripheral devices such as random access memory (RAM), read only memory (ROM), device controllers, etc. Each terminal system with its subsystems may at various times be required to perform various operations such as screen refresh of the cathode ray tube (CRT) of the terminal system, access main memory directly, or perform chip refresh for main memory. To perform these operations communication must be established over the system bus with an element of the computer system. This is generally accomplished by allocating one or more time cycles to the system bus for communicating with one or more elements. Many times requests for access to the system bus came simultaneously and required arbitration to determine which element would receive a cycle on the bus.

One prior art technique for performing this is disclosed in U.S. Pat. No. 4,028,664 by Earnest M. Monahan, et al entitled "Apparatus for Dispatching Data of the Highest Priority Process Having the Highest Priority Channel to a Processor, issued on June 7, 1977 to the same assignee as the instant invention. Another technique for performing this disclosed in U.S. Pat. No. 3,993,981 by Frank V. Cassarino, Jr., et al entitled "Apparatus for Processing Data Transfer Requests in a Data Processing System, issued Nov. 23, 1976, also to the same assignee as the instant invention. However, the prior art devices assign exclusive priority of the bus during a given time cycle. This excludes maximum utilization of the bus during a given time in arbitrating priorities.

What is needed is an improved priority resolver for access to a bus with improved utilization of the bus.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is accordingly a primary object of the invention to provide an improved operation of a computer system.

It is another object of the invention to provide for improved operation of an interactive terminal system.

It is a further object of the invention to provide improved arbitration logic permitting the maximum number of substantially concurrent cycles without interference with each other.

SUMMARY OF THE INVENTION

The foregoing objects are achieved according to one embodiment of the invention, and according to one mode of operation thereof, by providing logic circuits for assigning more than one cycle for concurrent execution on a bus.

An interactive terminal includes a central processor unit (CPU), a direct memory access (DMA) controller, a random access memory (RAM), a terminal display unit, a keyboard and a number of other subsystems such as screen refresh and keyboard controller. The CPU further includes bus arbitration logic which receives requests from the computer system elements and assigns time slots for use of the system bus in accordance with predetermined priorities.

To achieve concurrency of bus cycles, one unit having a shorter bus cycle than another utilizes the bus during a portion of the longer cycle when no information is being transferred over the bus. Hence the unit with the shorter bus cycle does not have to wait until the longer bus cycle terminates. For example, one processor cycle in the invention takes two memory cycles—memory cycle 1 and memory cycle 2. However the processor always accesses memory during memory cycle 2, this being the time slot when the processor utilizes the bus to transfer information. During memory cycle 1 the processor cycle still has access to the bus but does not utilize it. Accordingly still another cycle, chip refresh cycle, is activated concurrently with the processor cycle for assessing memory during memory cycle 1.

BRIEF DESCRIPTION OF THE DRAWINGS

The novel features which are characteristic of the invention as set forth with particularity in the appended claims. The invention itself, however, both as to organization and operation may best be understood by reference to the following description in conjunction with the drawings in which:

FIGS. 1A-1C show block diagrams of the interactive terminal system;

FIGS. 4 and 5 are truth tables for the bus decoder and refresh decoder.

DESCRIPTION OF THE PREFERRED EMBODIMENTS

Figure 1A:
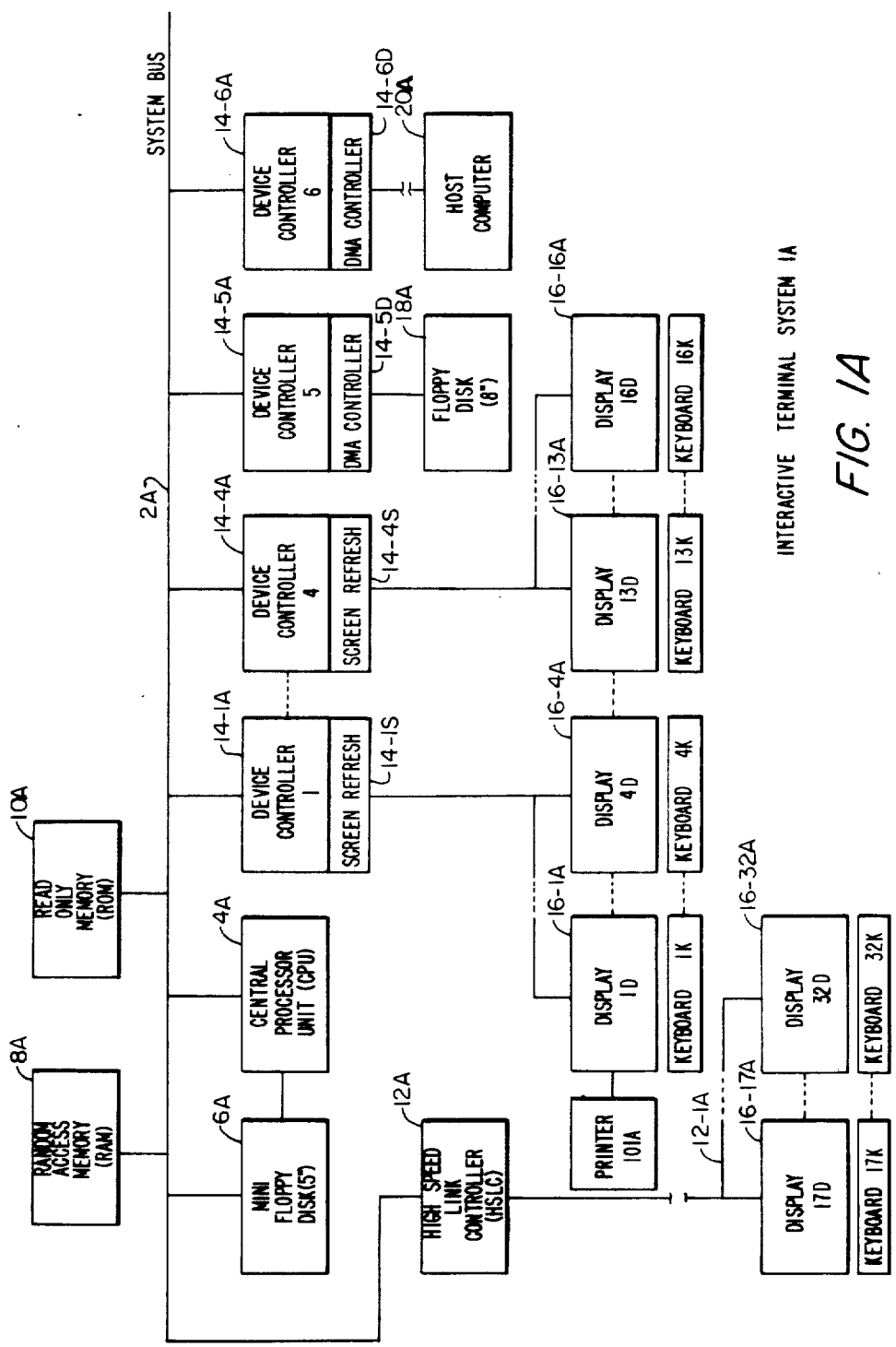

Referring to FIG. 1A there is shown a block diagram of a typical multi-application interactive terminal system 1A. Operators seated at work stations may input information into the system via keyboards and receive requested information from the system via cathode ray tube (CRT) displays. A work station includes a keyboard and a display, and a printer if required by the application. The typical system of FIG. 1A has 32 work stations, 16-1A through 16-32A. (Note that a printer 101A is included in the work station 16-1A.) Four work stations are coupled to device controllers 14-1A through 14-4A for a total of 16 work stations, and the 16 work stations are coupled to a high speed link controller (HSLC) 12A. The HSLC 12A eases the connection of work stations by "dropping" them from a cable 12-1A.

An eight inch floppy disk 18 stores data pertinent to the application for which system 1 is used. As an example, when system 1 is used in a financial application, the floppy disk 18 may store information about customer accounts and recent transactions prior to transmission to the host. Floppy disk 18 is coupled to disk controller 14-5.

A host computer 20A may couple system 1A to a communication network for enabling communication with other terminal systems or other host computers in the network. Host computer 20A is coupled to a device controller 14-6A.

Device controllers 14-1A through 14-6A and HSLC 12A are coupled in common to a system bus 2A, as are a central processor unit (CPU) 4A, a random access memory (RAM) 8A, and a read only memory (ROM) 10A. RAM 8A may store the operating system software, as well as other information during program execution. ROM 10A may store diagnostic programs for debugging system 1A, as well as programs for initializing system 1A during the "power-on" sequence.

CPU 4A controls the operation by generating the system bus 2A timing cycles. The CPU 4A generates bus 2A cycle priorities. The RAM 8A chip refresh cycle has the highest priority. Next in priority is the bus 2A cycle, called a DMA cycle, for transferring information between RAM 8A, ROM 10A or between device controllers 14-1A through 14-6A or HSLC 12A. Following in priority is a screen refresh cycle for the CRT's displays 1D through 16D. The CPU 4A has the lowest bus 2A cycle priority. The CPU 4A is also responsive to instructions received from RAM 8A or ROM 10A for typically controlling the system 1A operation, including branching to error routines, processing interrupts and performing diagnostic routines, as well as application programs.

Included in device controllers 14-1A through 14-4A are screen refresh controllers 14-1S through 14-4S; whereas included in device controllers 14-5A through 14-6A are DMA controllers 14-5D through 14-6D. Moreover, the system bus 2A is comprised of an address bus having address bits A0-A19 and a data bus having data bits D0 through D7.

Figure 1B:
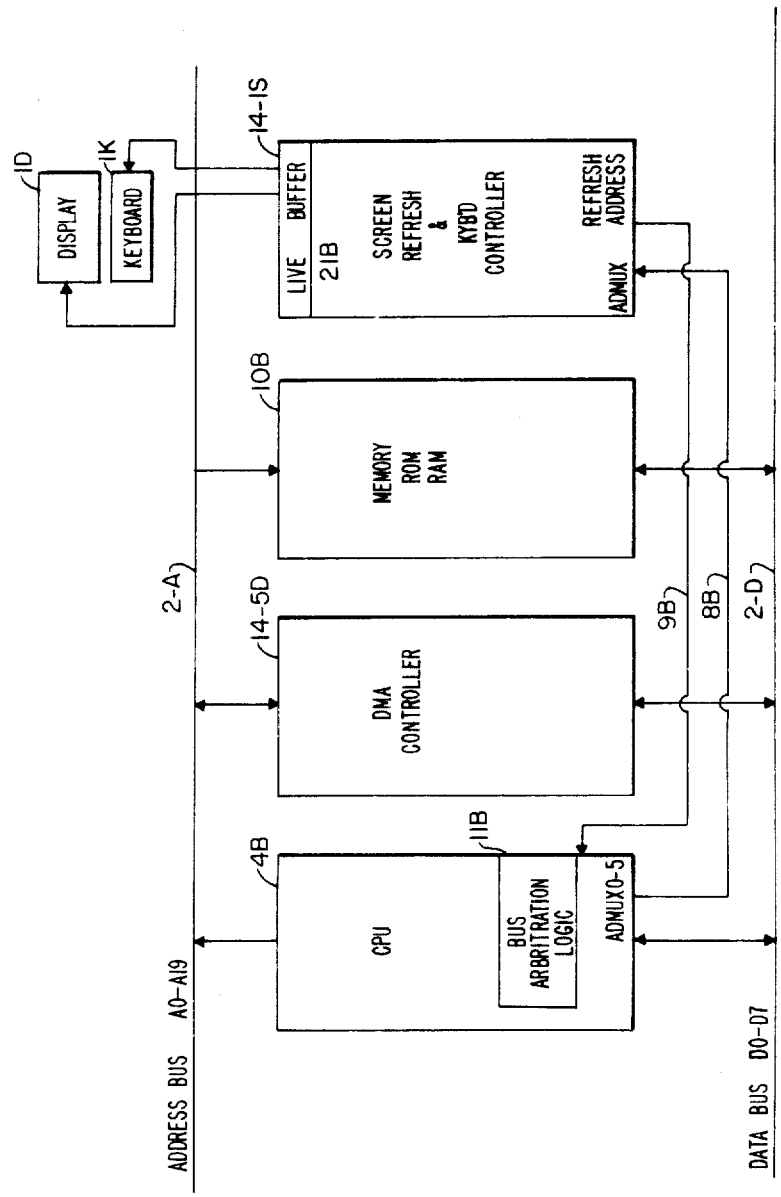

Referring now to FIG. 1B, there is shown a block diagram of the more essential elements of the invention. The address bus 2A and data bus 2D correspond to the system bus 2A of FIG. 1A. The address bus has bits A0 through A19, whereas the data bus has bits D0 through D7. The CPU 4B corresponds to the CPU 4A of FIG. 1A, the DMA controller 14-5D corresponds to one of the DMA controllers 14-5D, 14-6D of FIG. 1A; ROM and RAM memory 10B corresponds to ROM and RAM memories 10A, 8A of FIG. 1A; screen refresh and keyboard controller 14-1S corresponds to one of the device controllers 14-1A through 14-4A and 14-1S through 14-4S of FIG. 1A; while display 1D and keyboard 1K corresponds to one work station on FIG. 1A. The CPU 4B includes the bus arbitration logic 11B, which is more fully described infra utilizing FIGS. 2 and 3.

The basic concept of the invention is to permit the maximum number of substantially concurrent cycles without interference with each other. Prior art systems utilize exclusive cycles utilizing a priority scheme. Whereas the invention also utilizes a priority scheme to enable a cycle and allocate resources, the various cycles need not be exclusive but can be concurrent once initiated. The bus cycles of the system are synchronous and require 500 nanoseconds. A clock is set to 250 nanoseconds cycle time. The priorities for allocating cycles are as follows:

1. Chip refresh has the highest priority if a refresh cycle has not occurred within the last 15 microseconds, otherwise it has the last priority. Chip refresh is necessary for such devices as MOS memory which require the maintenance of an electric charge, otherwise they lose information stored therein.

2. The DMA channel is given the highest priority, except for case 1 above. As noted supra, the DMA cycle on the bus 2A is utilized for transferring information between RAM 8A, ROM 10A, controllers 14-1A through 14-4A, and controllers 14-5A through 14-6A, and HSLC 12A.

3. Screen refresh has the next highest priority. Screen refresh is necessary to maintain information on the cathode ray tube (CRT) screen, which in FIGS. 1A and FIG. 2A are shown as the displays 1D through 32D. There are two formats utilized which are character dependent. One format has 64 characters per line, whereas another format has 80 characters per line. For a single format system, the refresh cycles are allocated, two for refresh and one free to the system. For a dual format system—one utilizing the 64 character format and the 80 character format—three cycles are allocated. First the 64 character format is given 2 cycles and then the 80 character format is given a cycle. This process is repeated until one of the screens is satisfied. The contention for cycles occurs on a random basis since the frequency of the two formats is not a multiple of each other, with the exception of the basic 60 Hertz synchronization.

4. The processor (CPU) is given the lowest priority.

The system, however, is flexible and the priority can be varied. For example, the processor can be assigned a higher priority. The invention comprises the logic for arbitrating the DMA (direct memory access) cycle, refresh system A (64 character refresh), refresh system B (80 character refresh), processor cycle, and finally chip refresh. With respect to refresh systems A and B, refresh A has first priority over refresh B, but if refresh A has two cycles back-to-back, then refresh B can have a cycle after that. As noted earlier, the purpose of the screen refresh is to extract line data out of RAM memory to eventually be utilized to generate a composite video output to the CRT. (The RAM memory—not shown—is in the device controllers 14-1A through 14-4A. Each RAM contains the data for its respective displays. For example, displays 16-1A through 16-4A receive their data from the RAM in device controller 14-1A.) This is also true for screen refresh controllers 14-1S through 14-4S. It should be noted that these controllers 14-1A through 14-4A may be of the Type A or the Type B, which is merely a convenient designation to indicate that the controllers either control an 80 character screen, a 64 character screen, a 40 character screen, or some similar device with different characteristics. Accordingly the arbitration logic must additionally arbitrate at this level between the Type A and Type B controller. If, for example, screen refresh for Type A controller has had 2 cycles in a row, the next memory cycle is arbitrated among others according to the priority supra—the DMA controller has first priority, screen refresh B has second priority, and CPU has last priority. If none of these devices require a bus cycle, then screen refresh A would continue to utilize the bus cycle if it was necessary.

Referring now to FIG. 1C, the CPU 4A includes an Intel 8088 microprocessor 30C which generates 20-bit address signals AD0 through AD7 and A8 through A19 during address cycle time. The signals AD0 through AD7 are operative as bidirectional data signals during data cycle time. Address signals AD0 through AD7 and A8 through A19 are stored in an address latch unit 36C. This allows the signals AD0 through AD7 to transfer data during data cycle time. The address signals A0–A19 from address latch 36C are transferred over an address bus 76C to an address buffer 64C for transfer over system bus 2A. Bidirectional data signals AD0 through AD7 appear on data bus 78-1C and/or data bus 78-2C at data cycle time.

A clock generator 84C generates the basic timing for the system by making clock signals CK1 through CK12 available on system bus 2A. A processor clock signal PROC CLK provides the basic timing for the microprocessor 30C and a bus control and arbitration logic 32C. The PROC CLK signal is high between CK3 and CK5 time and between CK9 and CK11 time. Clock generator 34C also provides the RAM 8A, refresh timing signal DRAM REF REQ. This results in the bus control and arbitration logic 32C generating the RAM REF signal onto system bus 2A to refresh RAM 8A. Also, a number of miscellaneous timing signals generated from clock signal CK1 through CK12 are applied to bus control and arbitration logic 32C.

Bus control and arbitration logic 32C receives processor status signals S0, S1 and S2 to indicate the mode of operation, such as I/O read, I/O write, memory read, or memory write. The I/O operations refer to the microprocessor 30C communicating with one of the device controllers 14-1A through 14-6A, or the HSLC 12A, as well as all I/O operations within the CPU 4A. The memory read or memory write operation refers to the transfer of information between the microprocessor 30C and either RAM 8A, ROM 10A, RAM 40C or PROM 42C. Signal MR indicates a memory read out from RAM 40C or PROM 42C; and signal MW indicates a memory write; signal IW indicates an I/O write and signal IR indicates an I/O read operation. The processor ready signal PROC RDY indicates that the system bus 2A is busy and the microprocessor 30C should wait for the next non-busy system bus cycle. This will normally happen when the microprocessor 30C initiates a memory read, write or I/O cycle on system bus 2A, since the processor cycle has a two memory cycle duration.

The bus control and arbitration logic responds to a device controller request signal DMA REQ with a device controller acknowledgement signal DMA ACK indicating that the requesting device controllers 14-5A, 14-6A, or the HSLC 12A may communicate with RAM 8A or ROM 10A or device controllers 14-1A through 14-4A during a DMA bus 2A cycle. Also, screen refresh signal SCR REF indicates a display ID through display 16D refresh cycle and RAM refresh signal RAM REF indicates a RAM 8A refresh cycle.

A device select address decoder 38C generates enable signals $\overline{S1}$ through $\overline{S12}$ in response to address signals A0 through A19 to enable one of twelve logic elements of CPU 4A. The device select address decoder 38C also generates signals to enable device controllers 14-1A through 14-6A, HSLC 12A and ROM 10A. One of the enable signals and the write signal MB or IW applied to a logic element will result in enabling the logic element receiving a data byte via data bus 78-1C or 78-2C signals AD0 through AD7. If the read signal $\overline{RD}$ is applied to the enabled logic element, then the data bus 78-1C or 78-2C signals AD0 through AD7 are stored in the enabled logic element.

A timer 46C acts as a watchdog timer, a real time clock and a baud rate generator. A watchdog timer generates a signal WDT whenever an event that should have happened did not happen. A real time clock generates a signal RTC whenever the system desires an operation after a preset time. Signal BRG is applied to a USART 50C to generate the baud rate. Signal WDT is applied to a non-maskable interrupt register which generates an NMI signal. The microprocessor is responsive to the NMI signal and branches to a firmware or software routine to recover from the fault that resulted in the WDT signal. The real time clock signal RTC is applied to interrupt controllers 48C which generates the INT signal which interrupts microprocessor 30C. Microprocessor 30C enables interrupt controllers 48C via device select address decoder 38C and signal $\overline{S2}$ to read the data byte onto a data bus 78-1C to identify the interrupting device to branch to the subroutine that will process that interrupt. Address signals A0 and A1 select the mode of operation of the timer, the baud rate generator, watchdog timer or real time clock. Data bus 78-1C signals D0 through D7 set or read the count in the timer 46C.

The interrupt controller 48C has 16 levels of interrupt—level 1 having the highest priority interrupt and level 16 having the lowest level of interrupt.

The universal synchronous/asynchronous receive transmit controller (USART) 50C is capable of controlling communication lines which are coupled directly to the USART 50C. Signal $\overline{S3}$ enables the USART 50C, which transmits data received from data bus 78-1C signals AD0 through AD7, and receives data which it transfers to data bus 78-1C signals AD0 through AD7. The baud rate is generated by timer 46C and applied to USART 50C by signal BRG.

A 1k×9 RAM 40C stores the interrupt vectors. Four 8 bit bytes are reserved for each of the sixteen interrupt levels to point to the program to process the interrupt. The program may be stored in RAM 40C or in RAM 8C. Address signals A0 through A9 address the ten 24 byte locations. A PROM 42C optional from 8K to 32K bytes may store the routines to initialize the CPU 4A during the "power-up" operation. This loads RAM 40C, interrupt controllers 48C and timer 46C.

An address buffer 64C buffers the address signals A0 through A19 for transfer over system bus 2A. The address buffer 64C is deactivated during the DMA system bus 2A cycle when one of the device controllers 14-5A through 14-6A or the HSLC 12A is communicating with RAM 8A or ROM 10A or device controllers 14-1A through 14-4A since the device controllers 14-5A through 14-6A or the HSLC 12A is generating the RAM 8A or ROM 10A address or device controllers 14-1A through 14-4A address.

Screen AD MUX 66C is the multiplexer which selects either the address signals A0 through A10 and A12 or refresh address signals RA0 through RA11 from screen refresh memory (not shown) to generate refresh address signals ADMUX 0 through ADMUX 5 which are used to access and refresh the screen refresh memory. The screen refresh memory refreshes displays 1D through 16D.

The non-maskable interrupt register generates the NMI signal to interrupt the microprocessor 30C during power-up, the sensing of a parity error signal PERR from parity check 56C in addition to the watchdog timer error described supra.

Switch port 54C contains switches for storing addresses or configuring data during particular applications.

Parity check generator 56C receives data bus signals D0 through D7 and DP, and generates a parity or checks for a parity error, and indicates by data signals D0 through D2 if the parity error is a CPU 4A error or DMA error. The parity signals are stored in both RAM 40C and RAM 8A and device controllers 14-1A through 14-4A.

A cyclic redundancy check 58C is operated with USART 50C to generate during the transmit operation or to verify during the receive operation the cyclic redundancy check character.

An identification ROM 60C stores an identification number to identify the interactive terminals system 1A. This is particularly needed when system 1A is part of a large communication system and assures the sending device that the address system 1A has responded.

A self-test panel 74 contains a test switch, light emitting diodes (LEDS), communication LEDS or the data bus 78-2C via self-test panel logic.

A mini floppy disk 70C is coupled to the data bus 78-2C via a mini floppy disk control 68C to store additional programs or to store a record of all transactions processed by the CPU 4A.

Figure 2:
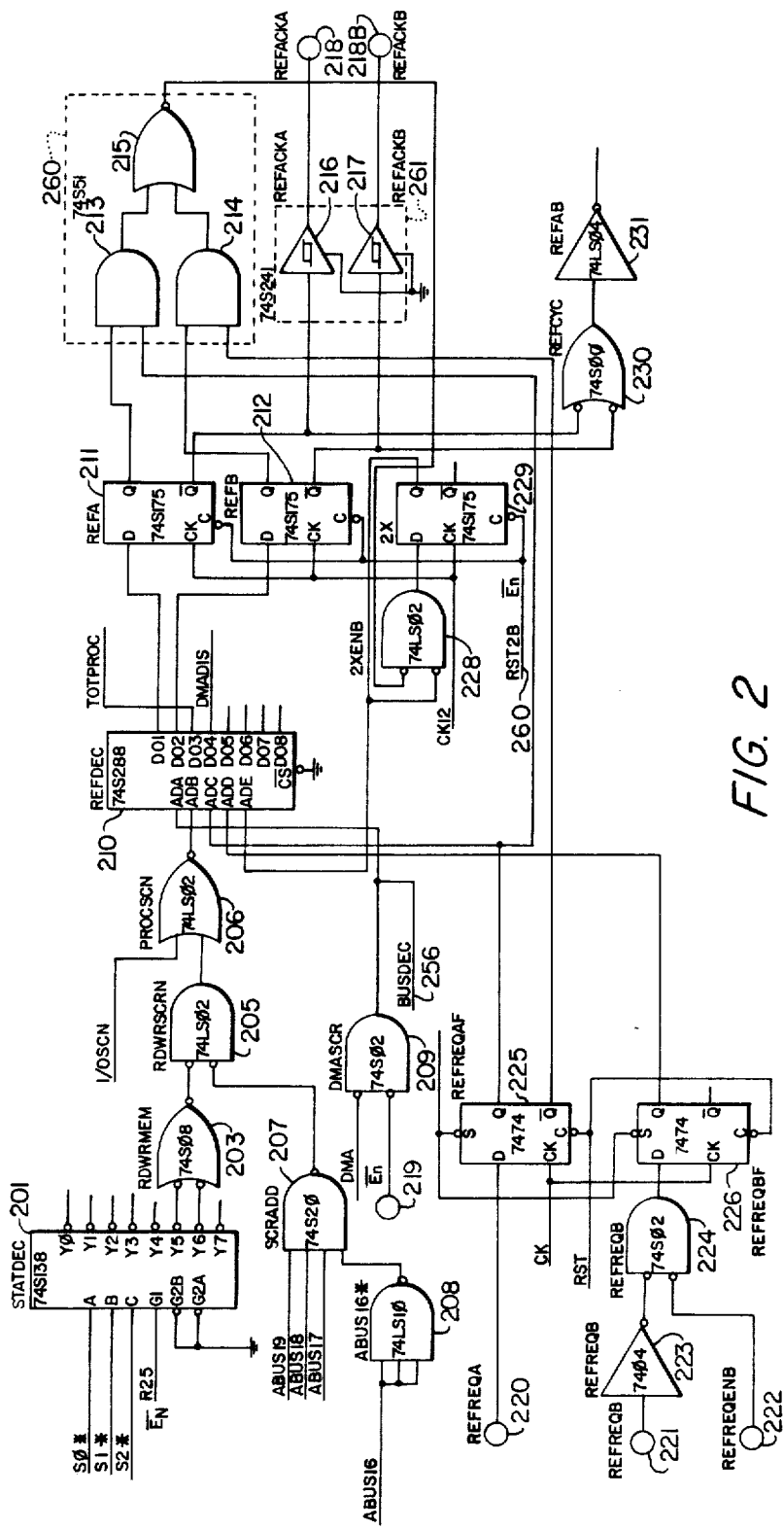
FIGS. 2 and 3 are detailed logic circuits of the bus arbitration logic.

Referring now to FIG. 2, there is shown the detail logic diagram of screen refresh control which arbitrates between different types of screen refresh systems requesting a refresh cycle. In describing this and subsequent Figures, the various apparatus will be identified by manufacturer's type number, as well as by function, and by reference numeral so that a person of ordinary skill in the art can, by utilizing the drawings and the description, construct the structure described. Additionally an example will be provided to teach the person of ordinary skill in the art how to determine the operation of the invention.

Referring again to FIG. 2, a Texas Instruments 74S288 type PROM 210 is utilized to decode the priority codes associated with a variety of priority conditions that have to be resolved between Type A screen refresh controller and Type B screen refresh controller, and provide an appropriate output signal REFACKA or REFACKB (depending upon the outcome of the resolution) on output terminals 218 or 218B, respectively. In order to arbitrate these priorities, the decoder receives various input signals indicative of different conditions requiring resolution. For example, refresh request A input in terminal 220 provides a refresh request signal REFREQA to input to terminal ADC of decoder 210 via a Texas Instruments type SN7474 flip-flop 225. (The truth table of flip-flop 225 is on page 5-22 of the Texas Instruments Incorporated "TTL Data Book for Design Engineers", 2nd edition.) The truth table indicates that when the D terminal of flip-flop 225, which is coupled to the REFREQA input in terminal 220, is high, and the C terminal is high, then the Q output terminal, which is coupled to the ADC input terminal of decoder 210, is also high. Conversely when the D input terminal of flip-flop 225 is low, the Q output terminal is also low; accordingly when pin terminal 220 is high, which is indicative of a Type A screen refresh cycle from controller 14-1S, the ADC input terminal of decoder 210 would be high. On the other hand, under these conditions the $\overline{Q}$ terminal of flip-flop 225 would be low and the output signal would be applied to one input terminal of AND gate 214. The other input terminal of AND gate 214 receives its signal from the refresh B (REFB) flip-flop 212. With one input terminal of AND gate 214 low it cannot be enabled and accordingly screen controller B cannot perform two successive refresh cycles.

When a Type B screen refresh controller from one of screen refresh controllers 14-1S through 14-4S requests a refresh cycle, than a high signal REFREQB is applied to input to pin terminal 221. This high signal is then applied to an SN7404 inverter 223, where it is inverted and applied to one input terminal of an SN74S02 type positive NOR gate 224. (The truth table of this type gate is $Y = \overline{A}$, where A and B are input signals and Y is an output signal.) Accordingly if both input signals on NOR gate 224 are low, the output will be high. Accordingly a high signal will be applied to the D input terminal of an SN7474 type flip-flop 226. Since the truth table of flip-flop 226 is the same as flip-flop 225 discussed supra, the Q output terminal of flip-flop 226 will be high, and accordingly a high signal will be applied to the ADD input terminal of decoder 210.

In arbitrating between a refresh cycle between Type A and Type B screen controllers, the decoder 210 also takes into consideration the status of the mode of bus operation; i.e, for example, is there a read/write cycle from the processor to the memory, and is that a read/write cycle to the screen memory. This is done by applying the status signals S0, S1 and S2, from the 8088 microprocessor 4A to input terminals A, B, C of an SN74S138 type decoder 201. These status signals are then decoded on terminals Y5 and Y6 of decoder 201 and applied to the input terminals of an SN74S08 type positive AND gate 203. The output of AND gate 203 is then applied as one input terminal of an SN74LS02 type positive NOR gate 205. The output from positive NOR gate 205 is applied as one input of another SN74LS02 positive type NOR gate 206. Finally the output of NOR gates 206 is applied to the ADB input terminal of decoder 210. The determination as to whether or not the address of the next memory cycle is actually a screen address or an address of any screen area is accomplished via an SN74LS10 type triple-input NAND gate 208 and an SN74S20 4-input type positive NAND gate 207, which together decode address bus bits 16–19. The decoded signal from NAND gate 207 is then applied to the other input terminal of an SN 74S02 type NOR gate 205. Terminals Y5 and Y6 when true signify that the processor wants to do a memory read or write cycle. When ANDed with the address pointing to screen memory (output of 207), it indicates that the processor wants to read or write to screen memory. This is then inputted to the decoder 210 so it can determine if refresh (A or B) or the processor can have the next cycle.

A further arbitration by the arbitration logic is to determine whether the DMA controller wants a screen access. Accordingly a DMA signal is provided by the DMA controller and applied to one input terminal of a SN74S02 type positive NOR gate 209. The other input terminal of NOR gate 209 is the enable not $\overline{En}$ on terminal 219. The output signal from NOR gate 209 is then applied to the ADA input terminal of decoder 210.

The input signals on decoder 210 are decoded so that between two requests from a Type A screen refresh controller and Type B, Type A will win the bus cycle when there is no read/write cycle to-or-from main memory or to-or-from screen memory and additionally there is no processor or DMA controller cycle. When, for example, the Type A screen refresh controller wins the bus cycle, a high signal will result on the D01 output terminal of decoder 210, which in turn is applied to the D input terminal of an SN74S175 type flip-flop 211. Since the enable not $\overline{En}$ signal on input line 260 is always high, the Q terminal of the flip-flop 211 will latch high on the next clock cycle and will provide a refresh knowledge REFACKA signal on terminal 218 via the SN74S241 type buffer gate 216. Additionally the SN74LS04 type inverter 231 will be true, since under these conditions the $\overline{Q}$ terminal of flip-flop 211 will be low and the $\overline{Q}$ terminal of flip-flop 212 will be high providing a low output signal from SN74S00 type positive NAND gate 230. By similar analysis, when the D02 output terminal of decoder 210 is high, the SN74S175 type flip-flop 212 will be true indicating that refresh B cycle has the bus.

Figure 3:
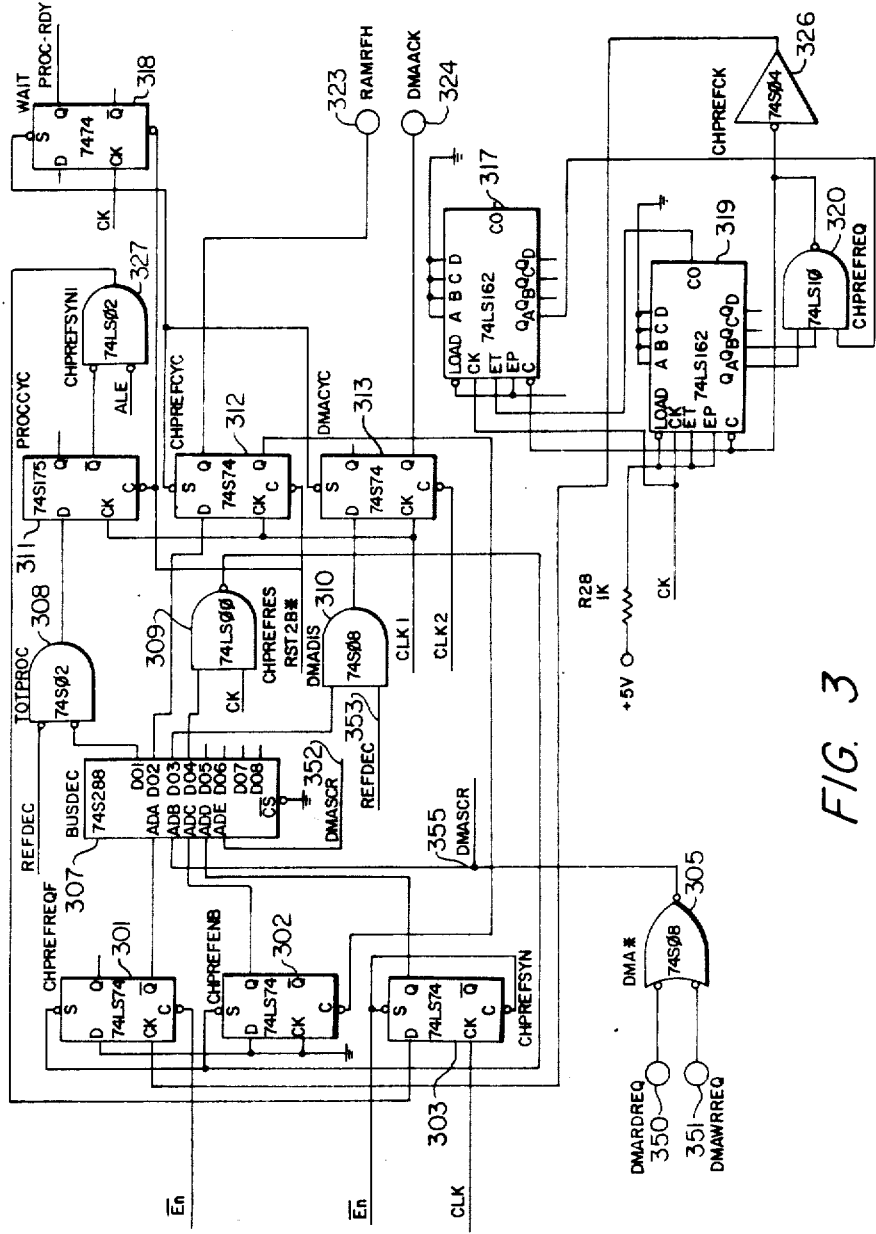

Referring now to FIG. 3 the bus arbitration logic will be further described. On FIG. 2 the logic which arbitrates between a Type A or Type B screen refresh control without interferring with the DMA processor cycle on a bus was described. FIG. 3 shows the total arbitration process between direct memory access controllers, processor and the winner of the chip refresh cycle.

Referring now to FIG. 3, a DMA read request (DMARDREQ) and DMA write request (DMAWRREQ) are applied respectively to input terminals 350 and 351. These signals are ORed together at a 74S08 type positive AND gate 305 and then applied to the ADB input terminal of an SN74S288 type bus decoder 307. A chip refresh request signal CHPREFREQF from the $\overline{Q}$ output terminal of an SN74LS74 type flip-flop 301 is also applied to the ADA input terminal of bus decoder 307. Still another input to the input terminal ADC of decoder 307 is the chip refresh enable (CHPREFENB) signal from the Q output terminal of an SN74LS74 type flip-flop 302. Yet another input to the ADB input terminal of decoder 307 is applied from the Q output terminal of an SN74LS74 type flip-flop 303. The final input signal on terminal ADE of decoder 307 is the DMA screen cycle (DMASCR) from line 352. Accordingly signals are applied to the input terminals of bus decoder 307 representing DMA read requests, a DMA write request, a chip refresh request, a chip refresh enable request and a DMA screen refresh. (The resolution of such requests are shown in the truth table of FIG. 4 to be described infra.) It should be noted that the function of the chip refresh request flip-flop 301 is to request a dynamic refresh cycle. The function of chip refresh enable flip-flop 302 is to permit the chip refresh cycle during the period that the Q terminal is high. The function of the chip refresh enable flip-flop 302 is to prevent another chip refresh cycle within a 15 microsecond period after the last chip refresh. The function of chip refresh sync flip-flop 303 is to allow the chip refresh to have the first half of a processor cycle when the processor doesn't want the bus 2A. Therefore chip refresh does not interfere with the processor cycle. The function of the SN74S02 type positive NOR gate 308 is to arbitrate the contention for a bus cycle between the processor and the DMA, or between the processor and the screen refresh cycle. When gate 308 is true, the SN74S175 type flip-flop 311 is true, and the processor obtains one cycle. On the other hand, if the chip refresh cycle is true, then the output D02 of decoder 307 is true, and the chip refresh cycle flip-flop 312 is true, and a chip refresh cycle is performed. If, however, the DMA is to have a cycle, decoder 307 decodes the input so that the D03 output terminal of decoder 307 is true; this signal is then applied as one input of an SN74S08 type positive AND gate 310 which is arbitrated with the refresh decode (REFDEC) signal on line 353. When AND gate 310 is true, the SN74S74 type flip-flop 313 is true and permits the occurrence of a DMA cycle. During this cycle, SN74LS162 type synchronous 4-bit counters 317 and 319, respectively, count approximately to 15 microseconds, after which time chip refresh is eligible to be considered as top priority once again.

Figure 4:
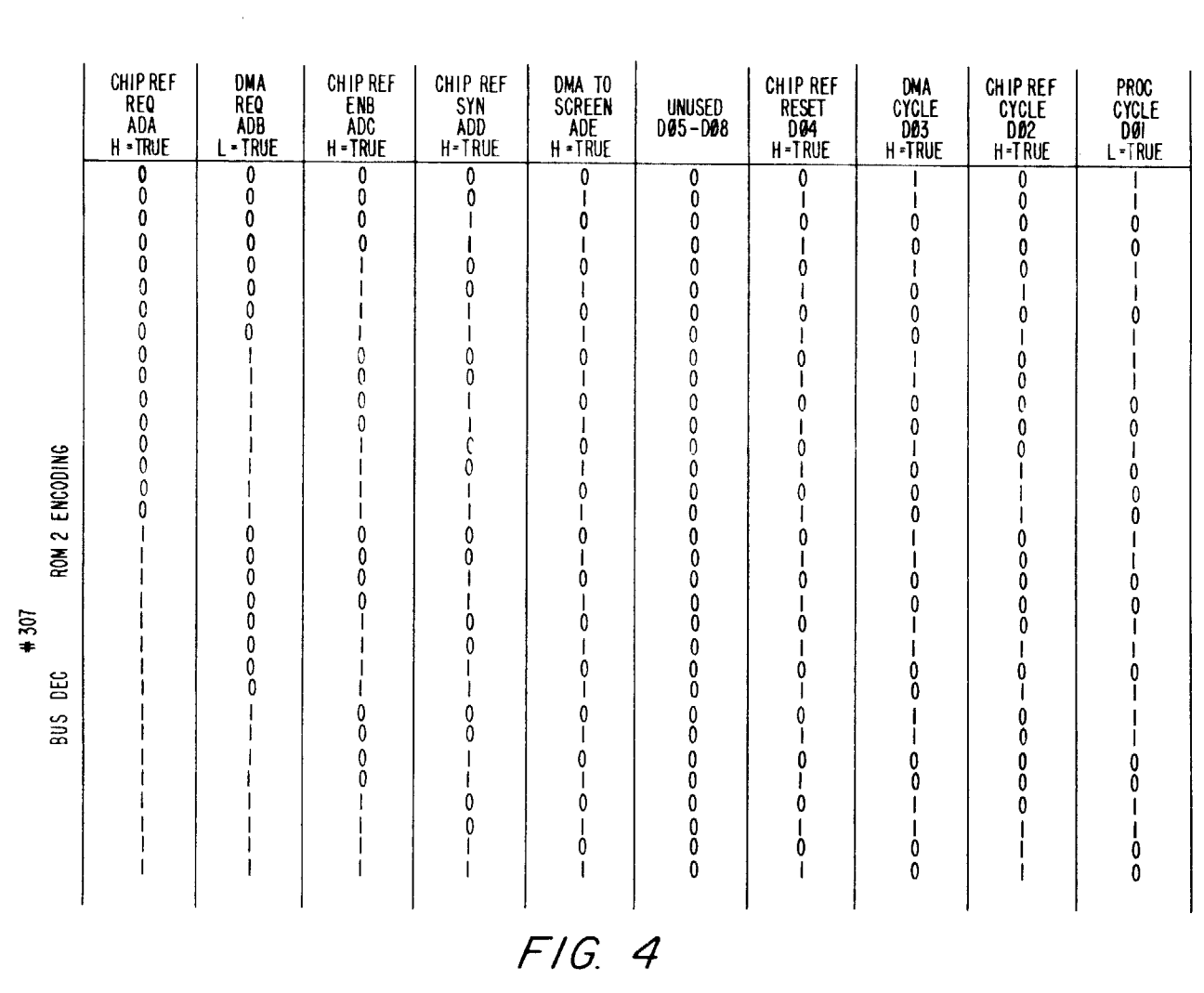

Referring now to FIG. 4, there is shown the truth table for bus decoder 307. The chart is substantially self-explanatory. The first five columns represent the signals on the input terminals of refresh decoder 307; whereas the last five columns represent the signals on the output terminals of bus decoder 307. It should be noted that the chip refresh request signal ADA is represented in the first column and is true when the terminal is high; the DMA request signal ADB is represented in the second column and is true when L is low, and so on with the remainder of input/output terminals of FIG. 4.

Figure 5:
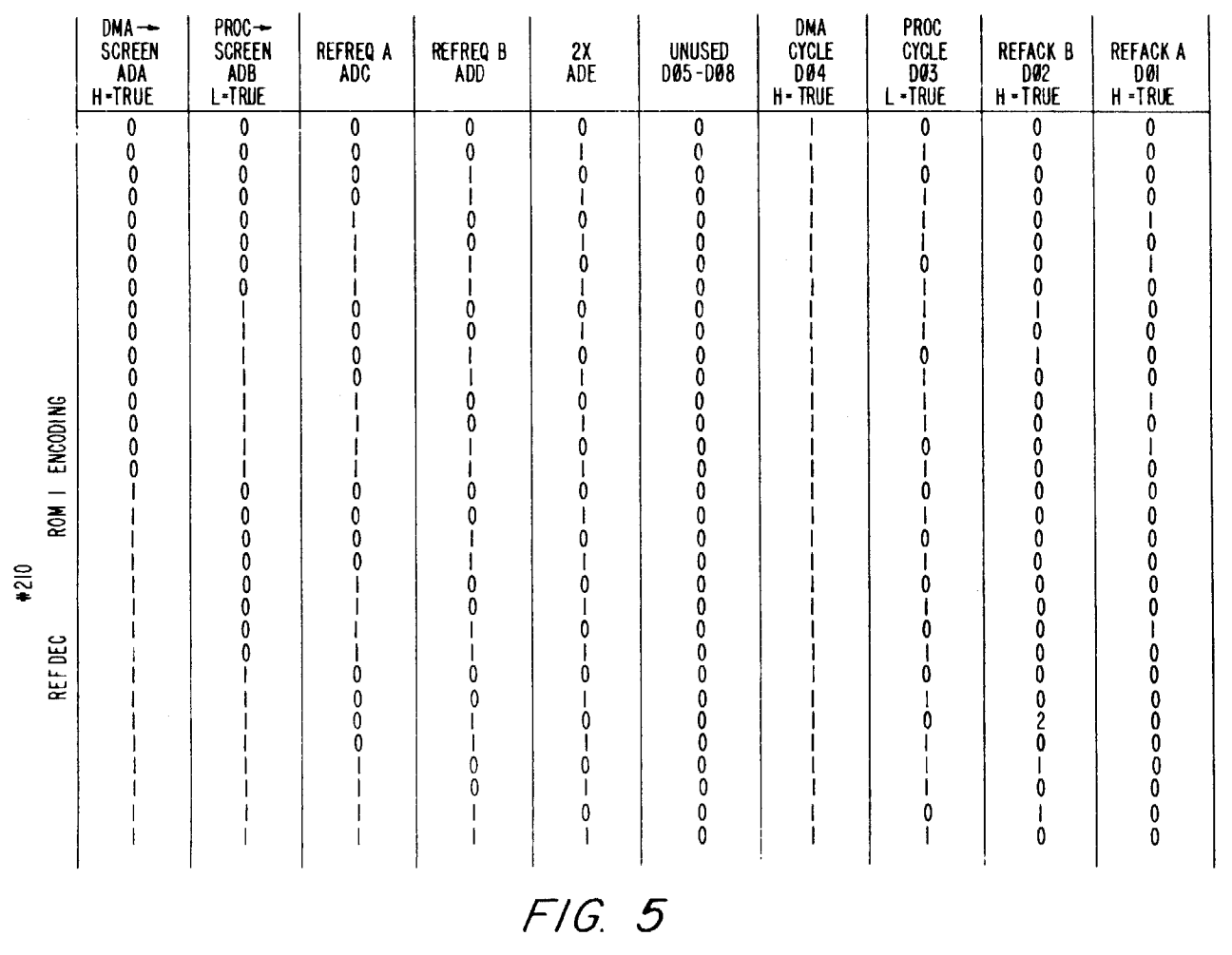

FIG. 5 is the truth table of the refresh decoder 210 which is read substantially in the same manner as FIG. 4. In order to further illustrate the use of these tables, assume that chip refresh request controller requires a cycle whereas the other devices do not require a bus cycle. This is shown on row 25. Referring to row 25, it will be seen that the chip refresh request ADA terminal of bus decoder 307 is high; additionally the DMA request controller terminal ADB is high indicating that this is not true; the remainder of the input terminals ADC, ADD and ADE are all low indicating that they are not true. This combination of signals is decoded at the output so that the D01 and D03 output terminals of bus decoder 307 are high. These signals then are further arbitrated through subsequent logic hardware.

Figure 3A:
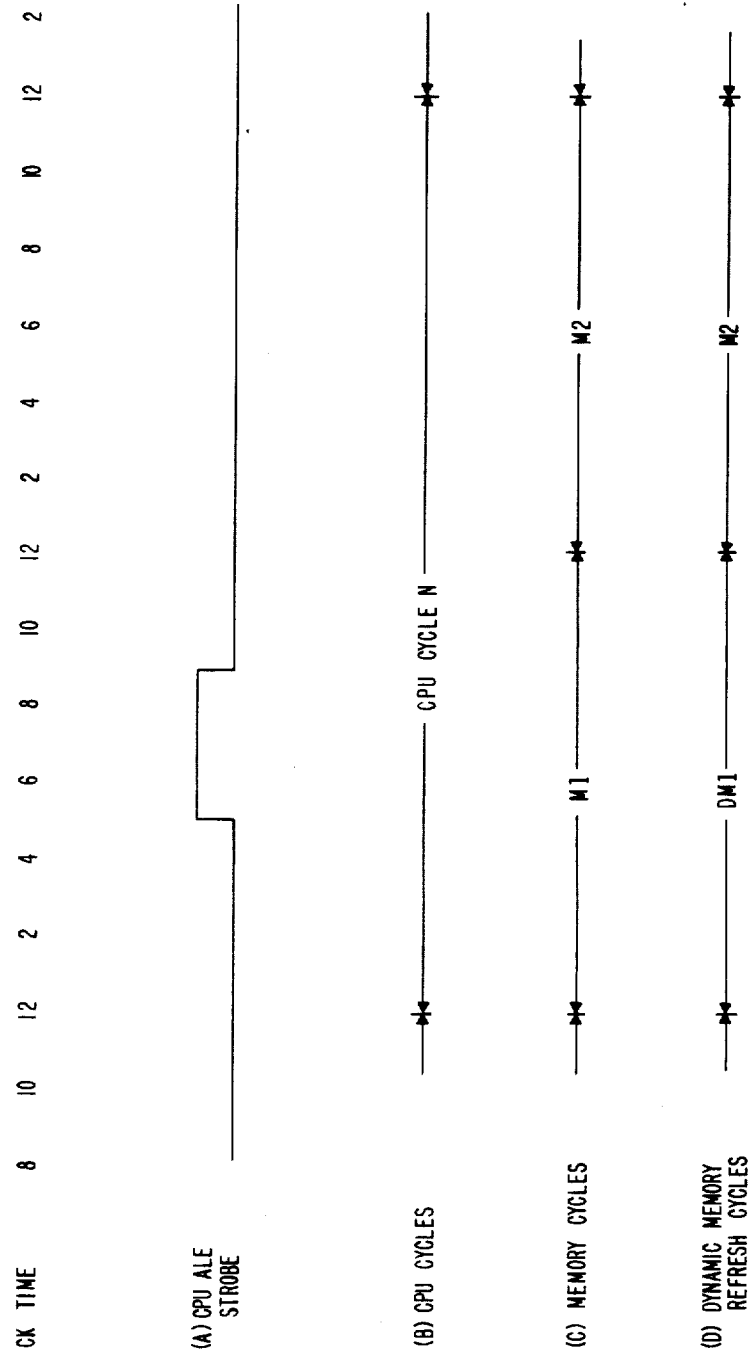
FIG. 3A is a timing diagram which shows the concurrency of a CPU cycle and a chip refresh cycle on the system bus.

Referring now to FIGS. 3 and 3A, chip refresh will be additionally described with the emphasis on the feature of performing dynamic memory refresh (i.e., chip refresh) during a chip refresh cycle which is concurrent with the CPU cycle. The CPU cycle N (B) (shown on FIG. 3A) is comprised of two memory cycles (C) M1 and M2. During the first half of the cycle M1, the CPU merely sets up new addresses in a CPU memory address register (not shown). During this half of the CPU cycle, which lasts for 500 nanosecnds, no information transfers take place and accordingly the bus is not utilized by the CPU cycle N which lasts for 1000 nanseconds. However, the latter part of the CPU cycle N which also lasts for 500 nanoseconds does utilize the bus for information transfers. Further the dynamic memory refresh cycle (D) is also a 500 nanosecond cycle, DM1, in which time the bus would be utilized to refresh the RAM memory. In order to avoid interference between the CPU (B) and the dynamic memory refresh cycle (D), prior art systems require two different cycles—a CPU cycle of 1000 nanoseconds and a DM1 cycle of 500 nanoseconds. The instant invention assures that the dynamic memory chip refresh cycle DM1 always occurs during the first half of the CPU cycle (B). Accordingly both the CPU cycle and the dynamic memory refresh cycle can be performed concurrently thus saving approximately 500 nanoseconds in performing these two operations.

Referring once again in FIG. 3A, it will be seen that a CPU ALE (address latch enable) signal strobe occurs at clock times 5 to 9. The CPU ALE strobe (A) strobes the CPU address bus 76C and status signals $\overline{S0}$, $\overline{S1}$ and $\overline{S2}$ into the address latch 36C of FIG. 2. The invention takes advantage of this by having the dynamic memory refresh cycle DM1 also begin concurrently with the beginning of the CPU cycle N. The dynamic memory refresh cycle will terminate after 500 nanoseconds after utilizing the system bus. However, during this part of the CPU cycle the CPU does not utilize the system bus, but merely provides address information to the CPU memory address register MAR (not shown). During the last half of the CPU cycle N the system bus is utilized by the CPU's memory cycle M2; however, by this time the dynamic memory refresh cycle has terminated and leaves the bus free.

Referring now to FIG. 3, the logic for accomplishing the chip refresh operation during a CPU memory cycle will be described. An ALE signal is applied to one input terminal of AND gate 327, whereas the output from the Q terminal of the process cycle flip-flop 311 is applied to the other input terminal on positive NOR gate 327. Positive NOR gate 327 is true when both inputs are true, and will provide a chip refresh synch (CHPREFSYN) signal to the D input terminal of chip refresh synch CHPREFSYN flop 303. The Q output terminal of flip-flop 303 is applied to the ADD input terminal of bus decoder 307, which as seen previously, arbitrates between the various requests.

It can be seen, therefore, that if the ALE signal is true at the input of gate 327 and also the processor cycle is true at the other input of AND gate 327, flip-flop 303 will latch and become true at this time. This true signal will be arbitrated at bus decoder 307 and the chip refresh cycle will be awarded according to other inputs of the bus decoder. If a chip refresh cycle is awarded, it can be seen that chip refresh cycle flop 312 will be true and provide a RAM refresh signal on RAMRFH terminal 323. This will occur only on the first half of the processor's cycle because positive NOR gate 327 allows the chip refresh cycle to proceed only if there is an ALE signal present. Since the processor cycle always occurs at the rising edge of the ALE signal, it is assured that the chip refresh cycle will occur in the first 500 nanoseconds of the total processor cycle which lasts for 1000 nanoseconds.

Having shown and described one embodiment of the invention, those skilled in the art will realize that many variations and modifications can be made to produce the described invention and still be within the spirit and scope of the claimed invention. Thus, many of the steps or hardware may be altered or replaced by different steps or hardware which will provide the same result and fall within the spirit of the claimed invention. It is the intention, therefore, to be limited only as indicated by the scope of all of the claims.

What is claimed is:

1. In an interactive computer terminal system having various subsystems, each subsystem communicating with each other by time-sharing a common bus, each subsystem requesting and being alloted on a priority basis a predetermined amount of time or bus cycle to use the bus, said predetermined amount of time being of different duration from each subsystem, said interactive computer terminal system comprising:
    (a) first means in one of said subsystems coupled to said bus for requesting a memory refresh bus cycle;
    (b) second means in another of said subsystems also coupled to said bus for requesting a processor bus cycle and wherein said processor bus cycle is made of a first half processor bus cycle equivalent to said memory refresh bus cycle and a second half processor bus cycle also equivalent to said memory refresh bus cycle;
    (c) third means coupled to said first and second means for permitting concurrent access to said bus for said first and second means so that both said processor bus cycle and said memory refresh bus can be performed concurrently and said memory refresh bus cycle is to begin concurrently with the beginning of said processor bus cycle, wherein said third means includes gate means responsive to an address latch enable signal which strobes a CPU address bus and a signal indicating the processor cycle for generating a chip refresh synchronization signal during the first half of the processor bus cycle, and bus decoder arbitration means coupled to said gate means and responsive to said chip refresh synchronization signal and other inputs for generating a chip refresh signal indicating that the memory refresh cycle has been awarded; and
    fourth means coupled to said third means and responsive to said chip refresh signal for permitting the use of said bus by said first means during the first half of said processor bus cycle when said first means is in a first operational state, and for permitting the use of said bus by said second means during the second half of said processor bus cycle.

2. The apparatus as claimed in claim 1 including fifth means coupled to said second means for assigning said second means to the bus for the entire duration of said processor bus cycle, but utilizing the bus during said second half processor bus cycle.

3. The apparatus as recited in claim 2 wherein said first means is a chip controller and wherein said second means is a CPU.

4. The apparatus as recited in claim 3 wherein said memory refresh controller is operative with a memory refresh main memory when said bus cycle coincides with said first half processor bus cycle during said first operational state.

5. The apparatus as recited in claim 4 wherein said central processor unit (CPU) is operative with said main memory when said memory refresh bus cycle coincides with said second half processor bus cycle during a second operational state.

6. The apparatus as recited in claim 5 wherein said first operational state represents a main memory refresh operation.

7. The apparatus as recited in claim 5 wherein said second operational state represents a main memory CPU information transfer.

* * * * *